(No Model.)

W. H. CARPENTER.
BICYCLE VALVE AND VALVE CONNECTION.

No. 601,460.  Patented Mar. 29, 1898.

Witnesses

Inventor
William H. Carpenter
By James Shepard
Atty.

UNITED STATES PATENT OFFICE.

WILLIAM H. CARPENTER, OF FORESTVILLE, CONNECTICUT.

BICYCLE-VALVE AND VALVE CONNECTION.

SPECIFICATION forming part of Letters Patent No. 601,460, dated March 29, 1898.

Application filed July 28, 1897. Serial No. 646,229. (No model.)

*To all whom it may concern:*

Be it known that I, WILLIAM H. CARPENTER, a citizen of the United States, residing at Forestville, in the county of Hartford and State of Connecticut, have invented certain new and useful Improvements in Bicycle-Valves and Valve Connections, of which the following is a specification.

My invention relates to improvements in bicycle-valves and valve connections; and the main object of my improvement is to provide a simple and efficient connection and one that requires no separate fastening device.

Figure 1:
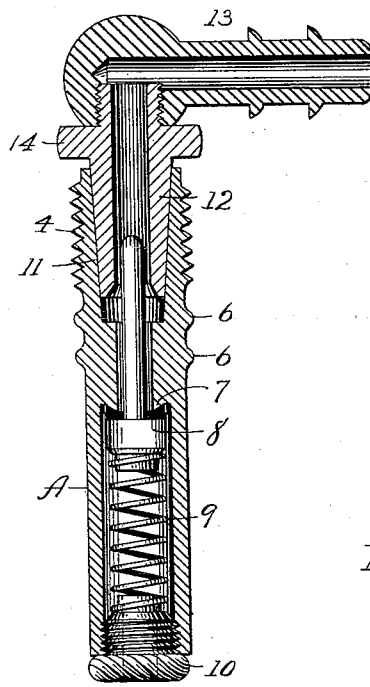
Figure 2:
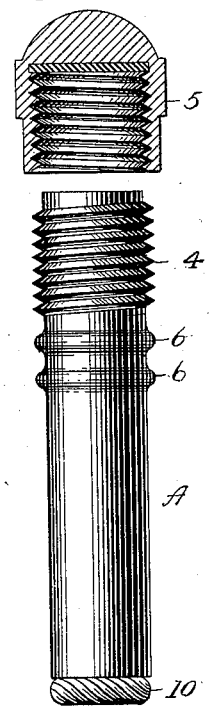

In the accompanying drawings, Figure 1 is a central longitudinal section, partly in elevation, of my valve and valve connection. Fig. 2 is a side elevation of the valve alone, together with a central sectional view of its cap; and Fig. 3 is a side elevation of my valve in a modified form, the same being of a straight form instead of the elbow form shown in Fig. 1.

A designates the valve body or case, screw-threaded, as at 4, near its upper end, for the reception of the ordinary cover or cap 5. Said case is also provided with ribs 6 and is designed to be secured to a pneumatic bicycle-tire in any ordinary manner. Within the body of the case is the valve-seat 7, valve 8, and spring 9, all of any desired or ordinary construction, the valve-stem extending outwardly through the valve-seat, as shown in Fig. 1. The lower end of the case is partially closed by the perforated screw 10, which may also be of any ordinary construction. The upper or outer end of the case is provided with an outwardly-flaring and long connection-seat 11 with straight and slightly-tapering sides of a much larger diameter than the said valve-stem, which extends within said connection-seat. The connection is provided with a tip or nozzle 12, of a tapering form, that closely fits the connection-seat 11 of the case and may also be provided with a flange 14. The outer end or flanged shank 13 of the connection is preferably arranged at right angles to the tip or nozzle and both parts axially perforated, as shown in Fig. 1. The parts 12 and 13 may be screwed together, as shown, or both screwed and soldered or otherwise connected, as may be desired. In Fig. 4 the modified form of connection is provided with the same tip or nozzle 12 and flange 14, but instead of a flanged shank arranged at an angle to the nozzle I employ the flanged shank 13$^a$ in alinement with said tip, the shank and tip being tubular or perforated, as before described, for the elbow connection. The flanged shanks are designed to be connected to one end of a flexible tube, the other end of which tube is suitably connected with an air-pump. The bore of the tip or nozzle in both constructions is of a considerably larger diameter than the valve-stem, so that the stem may enter said bore and permit the valve to seat itself under the influence of the spring and also so that the air may pass around said stem and through the tip in filling the tire.

To connect the valve with a pump, it is only necessary to remove the screw-cap 5 and then insert the tip or nozzle 12 of the connection, crowding it gently to its seat.

Figure 3:
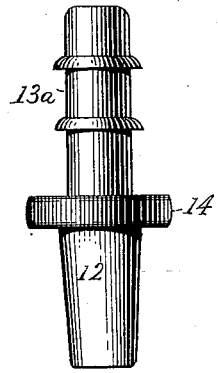

When the elbow form of connection, as shown in Fig. 1, is employed, the flexible tube leading to the pump can extend horizontally from the valve without any substantial bend, but when the straight form of connection shown in Fig. 3 is employed there will be a bend in the connecting-tube. To loosen the connection for removal, it is only necessary to twist it slightly in its seat.

I claim as my invention—

1. The combination of the valve-case A having the valve and spring chamber with a hole for the valve-stem through the valve-seat at the middle portion of the case, and at the outer end of the case an outwardly-flaring long connection-seat of a larger diameter than the hole for the valve-stem, the valve having a stem that extends through the hole in the valve-seat and within the flaring walls of the connection-seat, a spring for said valve and the tapering connection tip or nozzle fitted to said tapering connection-seat and having an internal bore for admitting the projecting end of the valve-stem substantially as described.

2. The combination of the valve-case A having the valve and spring chamber at one end and the outwardly-flaring connection-seat at its other end, the valve having a stem that extends within the walls of said connection-seat, a spring for said valve and an elbow connection having at one end a shank for a flexible connecting-tube and at the other end a tapering tip or nozzle adapted to be received in a common chamber with the outwardly-projecting end of the valve-stem substantially as described.

WILLIAM H. CARPENTER.

Witnesses:
JAMES SHEPARD,
A. W. STIPEK.